US012620204B2

(12) United States Patent
Grancharov et al.

(10) Patent No.: US 12,620,204 B2
(45) Date of Patent: May 5, 2026

(54) SYNTHETIC DIGITAL IMAGE GENERATION

(71) Applicant: Telefonaktiebolaget LM Ericsson (publ), Stockholm (SE)

(72) Inventors: Volodya Grancharov, Solna (SE); Ludwig Thaung, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 445 days.

(21) Appl. No.: 18/032,490

(22) PCT Filed: Oct. 19, 2020

(86) PCT No.: PCT/EP2020/079349
§ 371 (c)(1),
(2) Date: Apr. 18, 2023

(87) PCT Pub. No.: WO2022/083844
PCT Pub. Date: Apr. 28, 2022

(65) Prior Publication Data
US 2023/0386179 A1     Nov. 30, 2023

(51) Int. Cl.
*G06V 10/774*     (2022.01)
*G06T 7/11*     (2017.01)
*G06T 7/12*     (2017.01)

(52) U.S. Cl.
CPC .............. *G06V 10/774* (2022.01); *G06T 7/11* (2017.01); *G06T 7/12* (2017.01); *G06T 2207/20081* (2013.01); *G06T 2207/20084* (2013.01)

(58) Field of Classification Search
CPC ........... G06V 10/774; G06T 7/11; G06T 7/12; G06T 2207/20081; G06T 2207/20084;
(Continued)

(56) References Cited

U.S. PATENT DOCUMENTS 10,860,836 B1 * 12/2020 Tyagi ................... G06V 10/454
11,763,495 B2 * 9/2023 Ojha ......................... G06N 3/09
345/441
(Continued)

OTHER PUBLICATIONS

International Search Report and Written Opinion issued in International Application No. PCT/EP2020/079349 dated Jul. 19, 2021 (15 pages).
(Continued)

*Primary Examiner* — Bobbak Safaipour
(74) *Attorney, Agent, or Firm* — Rothwell, Figg, Ernst & Manbeck, P.C.

(57) ABSTRACT

There is provided mechanisms for rendering a synthetic digital image. A method is performed by an image processing device. The method comprises obtaining (S102) an original digital image. The original digital image represents a depiction of a visual scene that comprises at least one object. The method comprises identifying (S104) a first object in the original digital image. The first object is bounded by a bounding box in the original digital image. The method comprises generating (S106) a synthetic object by a Generative Adversarial Network processing the first object and a second object. The synthetic object has a shape defined by a binary segmentation mask as applied to the first object. The synthetic object has a texture and colour based on the second object. The method comprises rendering (S108) the synthetic digital image by, in the original digital image, replacing the first object in the bounding box with the synthetic object.

18 Claims, 6 Drawing Sheets

(58) Field of Classification Search
CPC ........ G06T 11/60; G06N 3/045; G06N 3/047;
G06N 3/088
See application file for complete search history.

(56) References Cited

U.S. PATENT DOCUMENTS

| 2020/0026278 | A1 | 1/2020 | Khanna et al. | |
| 2020/0279122 | A1* | 9/2020 | Lee ........................ | G06N 3/047 |
| 2021/0390319 | A1* | 12/2021 | Yang ...................... | G06V 20/46 |

OTHER PUBLICATIONS

Remez, T. et al., "Learning to Segment via Cut-and-Paste", Google,
Mar. 16, 2018 (17 pages).

\* cited by examiner

SYNTHETIC DIGITAL IMAGE GENERATION

CROSS REFERENCE TO RELATED APPLICATIONS

This application is a 35 U.S.C. § 371 National Stage of International Patent Application No. PCT/EP2020/079349, filed 2020 Oct. 19.

TECHNICAL FIELD

Embodiments presented herein relate to a method, an image processing device, a computer program, and a computer program product for generating a synthetic digital image.

BACKGROUND

Applications of visual object detectors can be found, for example, in the fields of recognizing objects on the road for self-driving vehicles, detecting object in smart factories, creating auto inventory of power grid installations or telecommunication installations. etc.

To be able to detect an object, the visual object detector first needs to be trained on data annotated with the correct location and class of the object. Historically, data annotation has been achieved by, in a set of images or video frames, manual labeling of the objects of interests. This is expensive and time-consuming procedure. Since some visual object detectors are based on Convolutional Neural Networks (CNNs) with many (such as millions of) training parameters, large portions of training data are needed.

One approach to make visual object detectors, trained with limited amounts of annotated data, more robust is to perform some type of data augmentation of the training data. Such data augmentation could involve simple manipulations of the training data, such as shifting, applying geometric transform, introducing perturbation on the color channels, etc. Such data augmentation could be regarded as artificial and completely disconnected from the specific domain where the visual object detector would be applied, and therefore bring only limited improvement in the training procedure.

More advanced methods for generations of domain relevant augmented data for training of visual object detectors have been proposed. These methods are based on rendering synthetic objects (with different poses) on top of a random background, thus enabling large amounts of annotated data to be generated; the location of each rendered synthetic objects is readily available at the rendering engine.

This approach, however, is not directly applicable for generating training data, in terms of synthetic digital images, for visual object detectors that should operate in scenarios, domains, or applications, where there are strict relations for connections and spatial relations between the objects to be detected.

Hence, there is still a need for efficient generation of such synthetic digital images.

SUMMARY

An object of embodiments herein is to provide efficient rendering of large amounts of synthetic digital images where there are strict relations for connections and spatial relations between objects.

According to a first aspect there is presented a method for rendering a synthetic digital image. The method is performed by an image processing device. The method comprises obtaining an original digital image. The original digital image represents a depiction of a visual scene that comprises at least one object. The method comprises identifying a first object in the original digital image. The first object is bounded by a bounding box in the original digital image. The method comprises generating a synthetic object by a Generative Adversarial Network processing the first object and a second object. The synthetic object has a shape defined by a binary segmentation mask as applied to the first object. The synthetic object has a texture and colour based on the second object. The method comprises rendering the synthetic digital image by, in the original digital image, replacing the first object in the bounding box with the synthetic object.

According to a second aspect there is presented an image processing device for generating a synthetic digital image. The image processing device comprises processing circuitry. The processing circuitry is configured to cause the image processing device to obtain an original digital image. The original digital image represents a depiction of a visual scene that comprises at least one object. The processing circuitry is configured to cause the image processing device to identify a first object in the original digital image. The first object is bounded by a bounding box in the original digital image. The processing circuitry is configured to cause the image processing device to generate a synthetic object by a Generative Adversarial Network processing the first object and a second object. The synthetic object has a shape defined by a binary segmentation mask as applied to the first object. The synthetic object has a texture and colour based on the second object. The processing circuitry is configured to cause the image processing device to render the synthetic digital image by, in the original digital image, replacing the first object in the bounding box with the synthetic object.

According to a third aspect there is presented an image processing device for generating a synthetic digital image. The image processing device comprises an obtain module configured to obtain an original digital image. The original digital image represents a depiction of a visual scene that comprises at least one object. The image processing device comprises an identify module configured to identify a first object in the original digital image. The first object is bounded by a bounding box in the original digital image. The image processing device comprises a generate module configured to generate a synthetic object by a Generative Adversarial Network processing the first object and a second object. The synthetic object has a shape defined by a binary segmentation mask as applied to the first object. The synthetic object has a texture and colour based on the second object. The image processing device comprises a render module configured to render the synthetic digital image by, in the original digital image, replacing the first object in the bounding box with the synthetic object.

According to a fourth aspect there is presented a computer program for generating a synthetic digital image, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient rendering of large amounts of synthetic digital images where there are strict relations for connections and spatial relations between objects.

Advantageously these aspects enable efficient rendering of realistic synthetic digital images where object are correctly connected and placed in relation to each other.

Advantageously the synthetic digital images can be readily used as training data by a visual object detector.

Advantageously these aspects can be used to lower the requirement on the number of manually annotated digital images needed to train a visual object detector.

Advantageously these aspects can be readily combined with existing techniques for data augmentation, such as shifting, scaling, etc.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for efficient generation of synthetic digital images where there are strict relations for connections and spatial relations between the objects.

The embodiments disclosed herein therefore relate to mechanisms for generating a synthetic digital image. In order to obtain such mechanisms there is provided an image processing device, a method performed by the image processing device, a computer program product comprising code, for example in the form of a computer program, that when run on an image processing device, causes the image processing device to perform the method.

Figure 1:
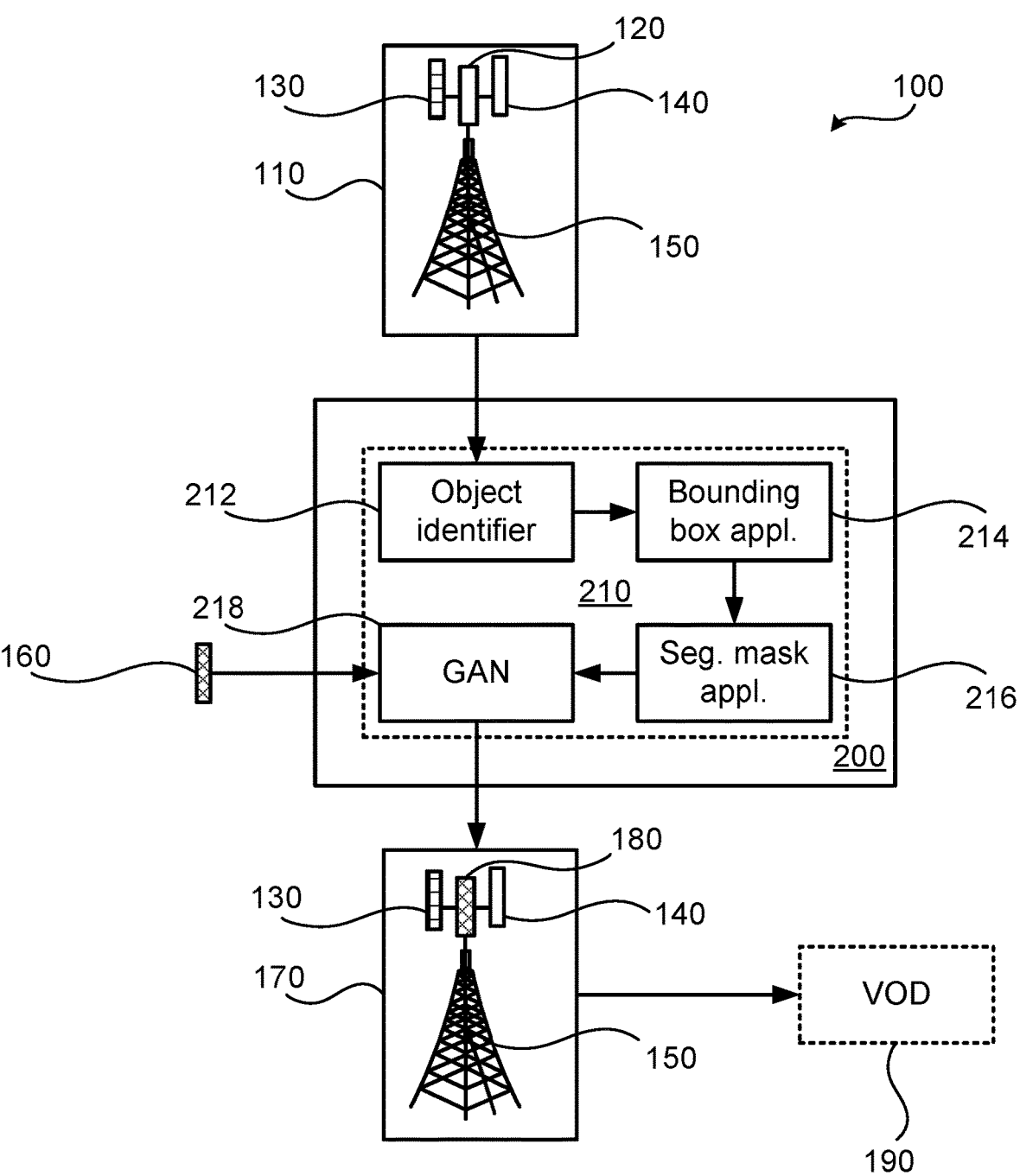
FIG. 1 is a schematic diagram illustrating an image processing system according to embodiments.

FIG. 1 is a schematic diagram illustrating an image processing system 100 according to an embodiment. The image processing system 100 comprises an image processing device 200 and an (optional) visual object detector (VOD) 190. The image processing device 200 is configured to, based on an original digital image 110, render a synthetic digital image 170. This synthetic digital image 170 can be fed as training data to the visual object detector 190. A synthetic digital image 170 is thus a digital image that is rendered based on an original digital image 110 where the original digital image 110 has been digitally manipulated, or processed, in some well-defined way. How the original digital image 110 will be digitally manipulated, or processed, to render the synthetic digital image 170 will be disclosed below with reference to FIG. 2.

The original digital image 110 represents a depiction of a visual scene. The visual scene comprises at least one object 120, 130, 140, 150. Hereinafter, object 120 will, for notational purposes, be referred to as a first object 120. In some examples, the first object 120 represents a depiction of a piece of industrial equipment in the visual scene. Some non-limiting examples of visual scenes where there are strict relations for connections and spatial relations between the objects are telecommunication systems, electric power grids, oil and/or gas production facilities, and industrial process sites. Hence, in some examples, the piece of industrial equipment is part of any of: a telecommunication system, an electric power grid, an oil and/or gas production facility, an industrial process site. For a telecommunication system, the piece of industrial equipment may be part of a base station, an antenna system, a remote radio unit (RRU), etc. In the illustrative example of FIG. 1, the visual scene comprises a telecommunication radio base station 150 (representing one object) equipped with antenna arrangements 120, 130, 140 (representing three objects). In some aspects, the original digital image 110 represents a manually annotated image set with segmentation masks and bounding boxes indicating location of the object of interest in the visual scene.

The original digital image 110 is input to the image processing device 200 where it is processed as will be described hereinafter. In the illustrative example of FIG. 1, the image processing device 200 comprises an object identification module 212, a bounding box application module 214, a segmentation mask application module 216, and a Generative Adversarial Network (GAN) 218 configured to process the original digital image 110. The GAN 218, by definition, introduces an element of randomness when processing the original digital image 110. In other words, the output from the GAN 218 will never be identical to the input to the GAN 218. The functionalities of the object identification module 212, the bounding box application module 214, the segmentation mask application module 216, and the GAN 218 might be implemented by processing circuitry 210.

As will be further disclosed below, the image processing device 200 processes the original digital image 110 for example by replacing the first object 120 in its bounding box with a synthetic object 180. The synthetic object 180 has a texture and colour based on an object different than the first object 120. Hereinafter, this object (different than the first object 120) will, for notational purposes, be referred to as a second object.

As will be further disclosed below, the second object is either part or is not part of the original digital image 110. In the illustrative example of FIG. 1, object 130 represents a second object 130 that is part of the original digital image 110 whereas object 160 represents a second object 160 that is not part of the original digital image 110. When the second object 160 is not part of the original digital image 110, the second object 160 could be obtained from any of: a production stencil, a three-dimensional (3D) Computer Aided Design (CAD) drawing, a digital blueprint, a digital image different from the original digital image 110.

Figure 2:
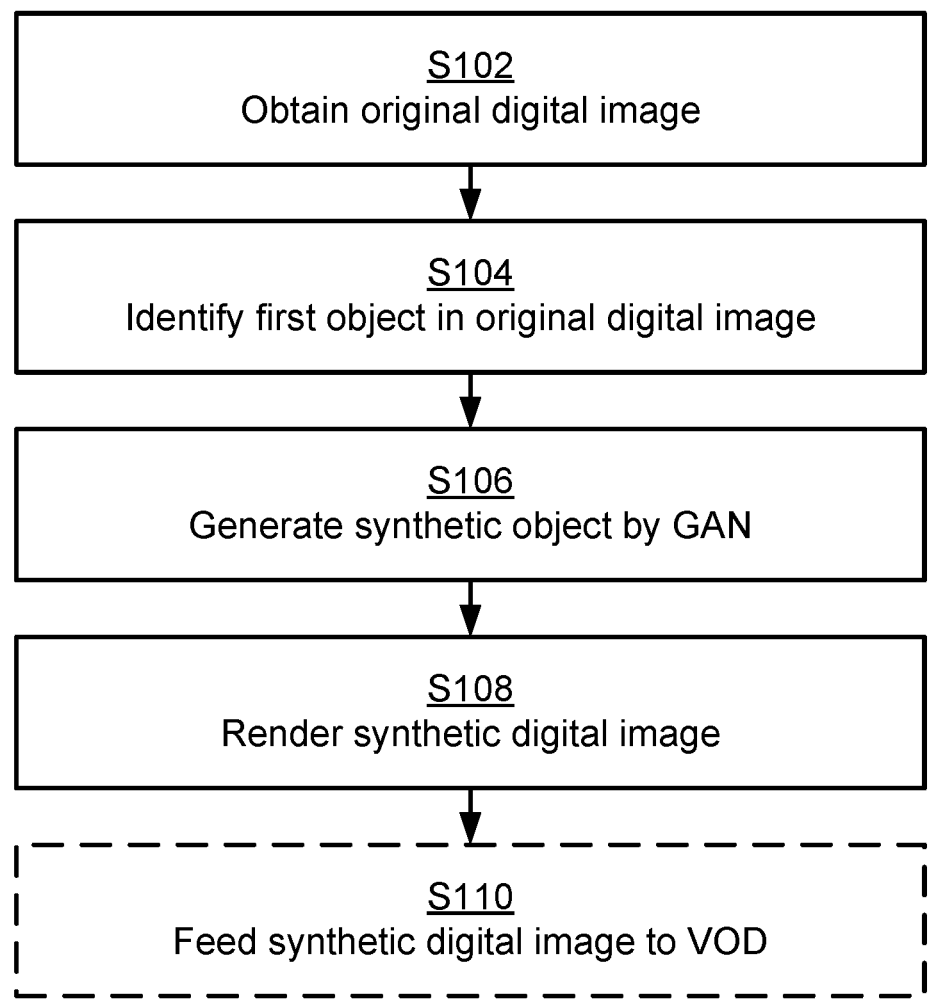
FIG. 2 is a flowchart of methods according to embodiments.
Figure 3:
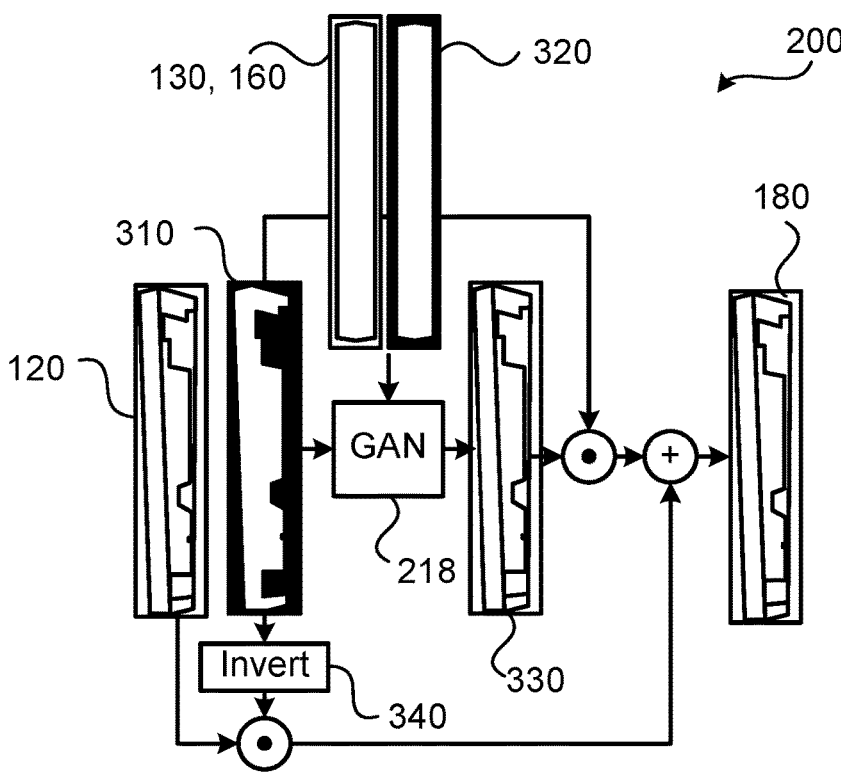
FIGS. 3 to 8 schematically illustrate blocks of an image processing device according to embodiments.

Methods for generating a synthetic digital image 170 will now be disclosed with reference to the flowchart of FIG. 2 with parallel reference to the block diagram of FIG. 3. The methods are performed by the image processing device 200. The methods are advantageously provided as computer programs 1120.

S102: The image processing device 200 obtains an original digital image 110. The original digital image 110 represents a depiction of a visual scene that comprises at least one object 120:150.

S104: The image processing device 200 identifies a first object 120 in the original digital image 110. The first object 120 is bounded by a bounding box in the original digital image 110. The identification of the first object 120 might be performed by the object identification module 212. The bounding box might be applied by the bounding box application module 216 to the original digital image no in order to extract the first object 120.

The herein disclosed embodiments are based on using a GAN 218 that generates a synthetic object 180.

S106: The image processing device 200 generates a synthetic object 180 by a GAN 218 processing the first object 120 and a second object 130, 160. The synthetic object 180 has a shape defined by a binary segmentation mask 310 as applied to the first object 120. The binary segmentation mask 310 might be applied by the segmentation mask application module 216. The synthetic object 180 has a texture and colour based on the second object 130, 160. The GAN 218, by definition, introduces an element of randomness when processing the first object 120 and the second object 130, 160. This results in that the texture and colour of the synthetic object 180 differ from the texture and colour of the second object 130, 160 by an amount that is proportional to the element of randomness.

In FIG. 3 an intermediate synthetic object 330 is illustrated. This intermediate synthetic object 330 has the texture and colour based on the second object 130, 160 but not necessarily the shape defined by the binary segmentation mask 310. The inverse of the binary segmentation mask 310 (as obtained by subjecting the binary segmentation mask 310 to an invert module 340) is therefore applied to the intermediate synthetic object 330 to yield the synthetic object 180. This also preserves content of the first object 120 outside the binary segmentation mask 310.

The synthetic object 180 is in turn placed into the original digital image 110 to render a synthetic digital image.

S108: The image processing device 200 renders the synthetic digital image 170 by, in the original digital image 110, replacing the first object 120 in the bounding box with the synthetic object 180.

Embodiments relating to further details of generating a synthetic digital image 170 as performed by the image processing device 200 will now be disclosed.

There might be different sources from which the second object 130, 160 can be obtained. In some aspects, the second object 160 is not part of the original digital image 110. That is, in some embodiments, the second object 160 is obtained from outside the original digital image 110. Different examples of such second objects 160 have been provided above. Thereby, when a new piece of industrial equipment is developed, the visual object detector 190 could be re-trained with digital synthetic images 170 of the new equipment placed in the correct positions of the scene. This drastically accelerates the performance of the visual object detector 190, as the current procedure is to wait until the new piece of industrial equipment actually is installed on massive scale, then making visual recordings of the new piece of industrial equipment as installed, annotate, and only then re-train the visual object detector 190. This could introduce a delay of 1-2 years after the release date of the new piece of industrial equipment. In other aspects, the second object 130 is also part of the original digital image 110. That is, in some embodiments, the visual scene comprises at least two objects 120:150, and the second object 130 is obtained from the original digital image 110.

When the second object 130 is extracted from the visual scene, and thus is part of the original digital image 110, the bounding box of the first object 120 and the bounding box of the second object 130 might be of different size compared to each other due to different size of the objects, different angle, distance between camera and the scene, etc. In general terms, regardless if the second object 130 is part of the original digital image 110 or not, the first object 120 and/or the second object 130, 160 might need to be scaled to be of the same size, or at least such that the bounding box of the first object 120 and the bounding box of the second object 130, 160 are of same size. For notational purpose, the bounding box of the first object 120 is denoted as a first bounding box. The second object 130, 160 might then be bounded by a second bounding box. Then, in some embodiments, at least one of the first object 120 and the second object 130, 160 is scaled such that the second bounding box is of same size as the first bounding box. In some examples, the first object 120 and the second object 130, 160 are scaled such that the bounding boxes are of a default dimension. As an illustrative, non-limiting, example, bounding boxes and corresponding binary segmentation masks can be scaled to a uniform resolution of 64-by-384 pixels (thus having a 1:6 aspect ratio), where, if any of the original (unscaled) bounding boxes deviate significantly from this aspect ratio, at least one of the bounding boxes is extended towards that aspect ratio. Of course, also other dimensions and aspects ratios are possible. The resulting synthetic object 180 might then be scaled back to match the binary segmentation mask of the first object 120.

There might be different shapes of the synthetic object 180. In some aspects, the synthetic object 180 has the same shape as the first object 120. That is, in some embodiments, the first object 120 is delimited by a contour, and the binary segmentation mask 310 follows the contour of the first object 120. However, in other aspects, the synthetic object 180 has another shape than the first object 120. That is, in some embodiments, the binary segmentation mask 310, when applied to the first object 120, deviates from the contour of the first object 120.

There could be different ways to implement the embodiment where the binary segmentation mask 310, when applied to the first object 120, deviates from the contour of the first object 120.

If the synthetic object 180 is larger than the first object 120, then the pixels of the synthetic object 180 that are outside the first object 120 need to be filled. In particular, when the binary segmentation mask 310 extends beyond the contour of the first object 120, the texture and colour in the part of the synthetic object 180 that extends beyond the contour of the first object 120 is, in some embodiments, based on at least one of: the texture and colour of the second object 130, 160, texture and colour of a third object, context-based texture and colour as provided by the GAN 218. Thus, the GAN 218 might be configured to estimate values of the pixels of the synthetic object 180 that are outside the first object 120 based on content-awareness (i.e., awareness of the values of the pixels outside the first object 120).

Further aspects of how the synthetic object 180 can be generated will now be disclosed.

In some aspects, part of the first object 120 is preserved in the synthetic object 180. In particular, in some embodiments, part of the texture and colour of the first object 120 is preserved when being processed by the GAN 218. In this respect, the first object 120 is delimited by a contour, and the binary segmentation mask 310 when applied to the first object 120 might at least partly be confined within the contour of the first object 120, and the part of the texture and colour of the first object 120 that is not at least partly covered by the binary segmentation mask 310 is preserved when being processed by the GAN 218.

In some aspects, if a change of the shape of the first object 120 is required, then an additional binary segmentation mask could be provided that specifies the new shape. The generator could then either be trained to only replace the pixels which the new binary segmentation mask specifies or replace all the pixels of the first object 120, or even all pixels within the bounding box of the first object 120 but make the background as close as possible to the background in the bounding box to make the background to visually appear unmodified.

Figure 4:
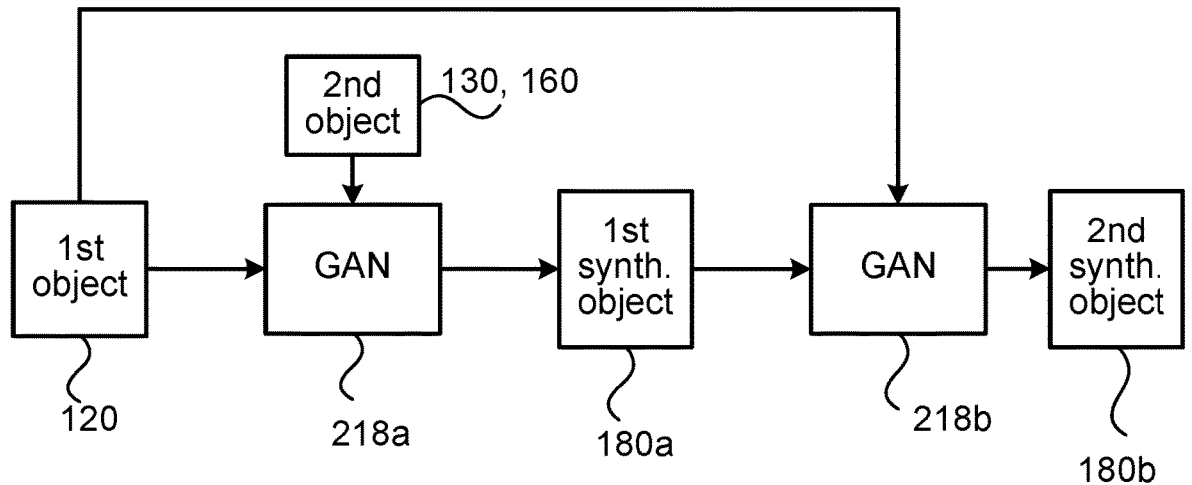

In another scenario, the application may require some elements (in addition to the shape) of the first object 120 to be preserved. Different training methods could then be used to make the generator learn to preserve some structure of the first object 120 but apply the texture and color of the second object 130, 160. For example, as illustrated in FIG. 4, a first synthetic object 180a could be rendered based on the first object 120 and a second object 130, 160 as above using a first GAN 218. A second synthetic object 180b is then rendered in the same way using a second GAN 218 but where, in terms of input to the second GAN 218, the first object 120 is replaced by the first synthetic object 180 and the second object 130, 160 is replaced by the first object 120. The second synthetic object 180b is then closer to the first object 120 than the first synthetic object 180b.

In some aspects, also a segmentation mask 320 is applied to the second object 130, 160. In particular, the binary segmentation mask 310 applied to the first object 120 might be denoted as a first binary segmentation mask 310, and a second binary segmentation mask 320 is applied to the second object 130, 160 when being processed by the GAN 218. Whether or not such a second binary segmentation mask 320 needs to be applied to the second object 130, 160 might depend on the shape of the second object 130, 160.

Aspects relating to different uses of the synthetic digital image 170 will be disclosed next.

For example, the synthetic digital image 170 is readily available as training data of a visual object detector 190. Hence, in some aspects, the synthetic digital image 170 is used for training purposes by a visual object detector 190. Therefore, according to an embodiment, the image processing device 200 is configured to perform (optional) step S110:

Silo: The image processing device 200 feeds the synthetic digital image 170 as training data to a visual object detector 190.

In this respect, having access to different second objects 130, 160 enables the image processing device 200 to render different synthetic digital images 170. Still further synthetic digital images 170 can be rendered by identifying a further first object 120, generating a further synthetic object 180 and then rendering a further synthetic digital image 170 by, in the original digital image 110, replacing the further first object 120 in its bounding box with the further synthetic object 180. Hence, the embodiments disclosed herein enable large amounts of training data to be generated for the visual object detector 190.

Another application where the herein disclosed embodiments could be used is computer gaming.

According to a first example, the synthetic object 180 could represent objects, background areas, and characters with new colors and textures (compared already existing objects, background areas, and characters) in the computer game environment. This could increase the variation of objects, background areas, and characters such that the rendered environment is slightly different from one game play to the next, and thus increase replayability, or replay value, of the game.

According to a second example, the herein disclosed embodiments could be used to allow a user to import custom files (defining the second object) that can be used as style files for replacing visual appearances of certain set of objects (defining the first object) in the computer game environment.

Figure 5:
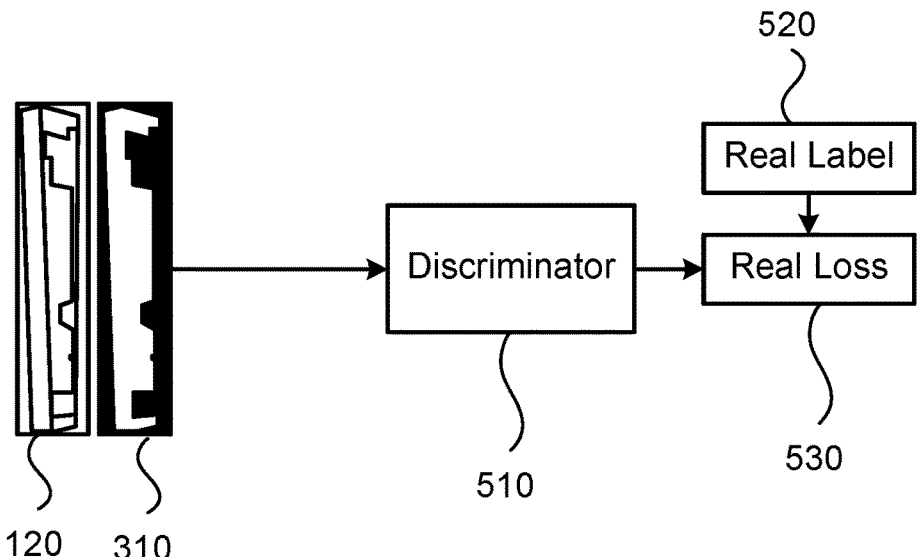
Figure 6:
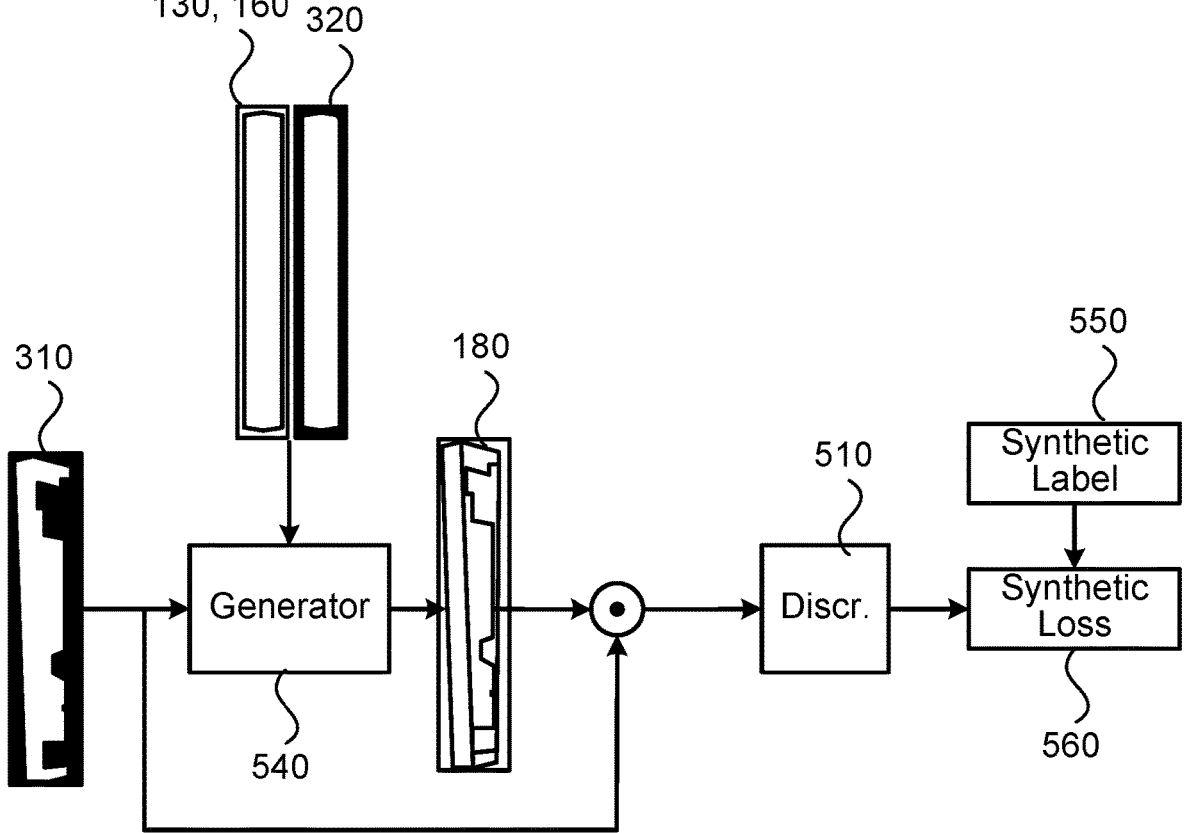

In some aspects, the GAN 218 is trained prior to processing the first object 120 and the second object 130, 160 in order for the image processing device 200 to generate the synthetic object 180 in step S106. The training of the GAN 218 is illustrated in FIG. 5 and FIG. 6. What could be provided to the GAN 218 for training is a set of first objects 120 bounded by respective bounding boxes and their corresponding binary segmentation masks 310, as well as a set of second objects 130, 160 bounded by respective bounding boxes and their corresponding binary segmentation masks 320.

A discriminator module 510 is configured to optimize its weights to make correct predictions, whereas a generator module 540 is configured to optimize its weights to make the discriminator module 510 output incorrect predictions (thus introducing an element of randomness in the GAN 218). Furthermore, the generator module 540 is configured to make the appearance of the synthetic object 180 similar to the second object 130, 160. A real label module 520 and a synthetic label module 550 could be used to indicate to the training algorithm whether it is presented with synthetic or real images. In FIG. 5 the discriminator module 510 is trained with real images whereas in FIG. 6 the discriminator module 510 is trained with synthetic samples. The synthetic loss module 560 is configured to update the weights of the generator module 540 and the discriminator module 510, whilst the real loss module 530 is configured only to update the weights of the discriminator module 510. In the illustrative example of FIG. 5 the input is represented by 1) a digital image of a first object 120 depicting a real antenna, and 2) a binary segmentation mask 310 of the antenna. In the illustrative example of FIG. 6 the input is represented by 1) the same binary segmentation mask 310 as in FIG. 5, 2) a digital image of a second object 130, 160 depicting a new antenna which visual appearance, in terms of texture and color, that is to be learned and rendered on a position of the first object 120, and 3) a binary segmentation mask 320 of the new antenna.

Figures 7, 8:
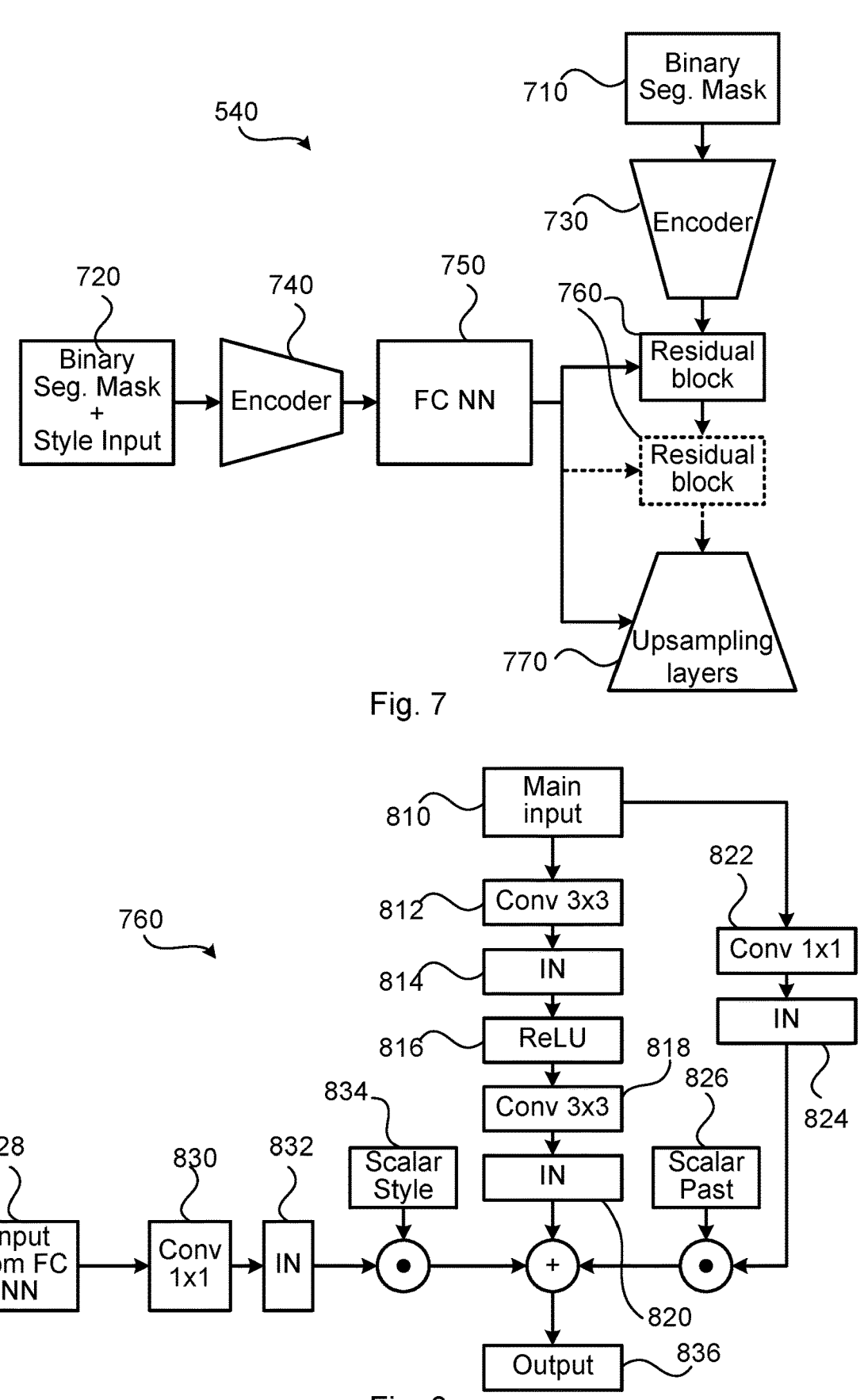

FIG. 7 schematically illustrates the generator module 540 according to an example. The generator module 540 takes as input a main input 710 and a side-input 720. The main input 710 consists of a binary segmentation mask 310 of the first object. The main input 710 is sent in through an encoder module 730 before being sent to residual blocks 760. The 5-channel side-input 720 consists of: a digital image depicting a second object 130, 160 with texture and color, a binary segmentation mask 320 for the second object 130, 160, and a binary segmentation mask 310 of a first object 120. It is this input that provides the texture and color information to the GAN 218. The 5-channel side-input 720 is sent in through an encoder module 740 and a mapping network in the form of a fully connected (FC) neural network (NN) 750 before being sent to residual blocks 760 and up-sampling layers 770. The encoder modules 730, 740 are convolutional neural networks (CNNs) that are configured to down-sample the inputs to a lower resolution. The up-sampling layers 770 comprises convolutional layers that are configured to up-sample the input to the correct image size. The FC NN 750 is configured to map the texture and color input to enable the network to successfully apply the texture and color on the synthetic object 180. One or more residual blocks 760 increase the networks ability to generate realistic synthetic objects 180 by increasing the depth of the network, whilst also making the network able to take the second object into consideration.

In FIG. 7 there might be either a single residual block 760 or two or more concatenated such residual blocks 760. FIG. 8 schematically illustrates one such residual block 760. FIG. 8 schematically illustrates one such residual block 760 in more detail according to an example. The input from FC NN 828 is a tensor that is provided as output from the FC NN 750 whereas the main input 810 is a tensor that comes from the encoder 730 (or in case of concatenated residual blocks 760, from the previous residual block 760). The output 836 of the operations in FIG. 8 is a tensor that is provided as input to the up-sampling layers 770. The main input 810 is fed through two pathways; one for extracting more features, and one for weighting the past input more if extraction of more features is unnecessary. The notation "−" denotes scalar multiplication with a tensor and the notation "+" denotes adding elements of three tensors. The operation conv 1×1 at reference numerals 822, 830 changes the depth of the tensor; as a non-limiting and illustrative example, a tensor of dimensions 64-by-32-by-256, is when using conv 1×1 with 16 filters converted to a tensor with dimensions 64-by-32-by-16). The operation conv 1×1 is used to unify dimensions of tensors coming from the different pathways. The operation conv 3×3 at reference numerals 812, 818 extracts features from the input (by transforming one tensor into another tensor). The operation IN at reference numerals 814, 820 is an instance normalization layer that removes the mean and scales with standard deviation. Scalar style 834 and scalar past 826 are scalars that add different weights to the different pathways. In some non-limiting and illustrative examples, these scalars take a value between 0 and 1. In some non-limiting and illustrative examples these scalars sum to 1. The operation ReLU at reference numeral 816 is a rectified linear unit that is used as activation function.

Figure 9:
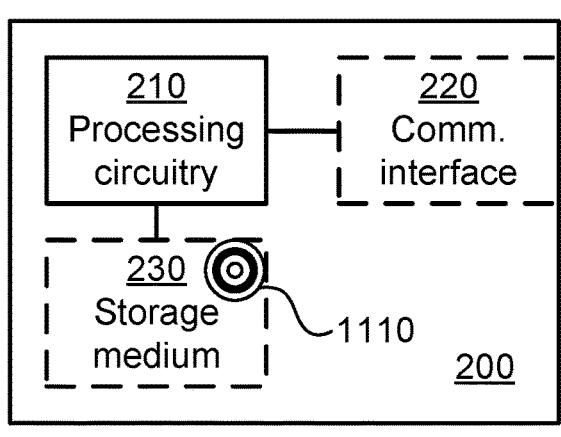
FIG. 9 is a schematic diagram showing functional units of an image processing device according to an embodiment.

FIG. 9 schematically illustrates, in terms of a number of functional units, the components of an image processing device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the image processing device 200 to perform a set of operations, or steps, as disclosed above. For example, the storage medium 230 may store the set of operations, and the processing circuitry 210 may be configured to retrieve the set of operations from the storage medium 230 to cause the image processing device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The image processing device 200 may further comprise a communications interface 220 at least configured for communications with other devices, entities, functions, nodes, modules, and systems.

As such the communications interface 220 may comprise one or more transmitters and receivers, comprising analogue and digital components. The processing circuitry 210 controls the general operation of the image processing device 200 e.g. by sending data and control signals to the communications interface 220 and the storage medium 230, by receiving data and reports from the communications interface 220, and by retrieving data and instructions from the storage medium 230. Other components, as well as the related functionality, of the image processing device 200 are omitted in order not to obscure the concepts presented herein.

Figure 10:
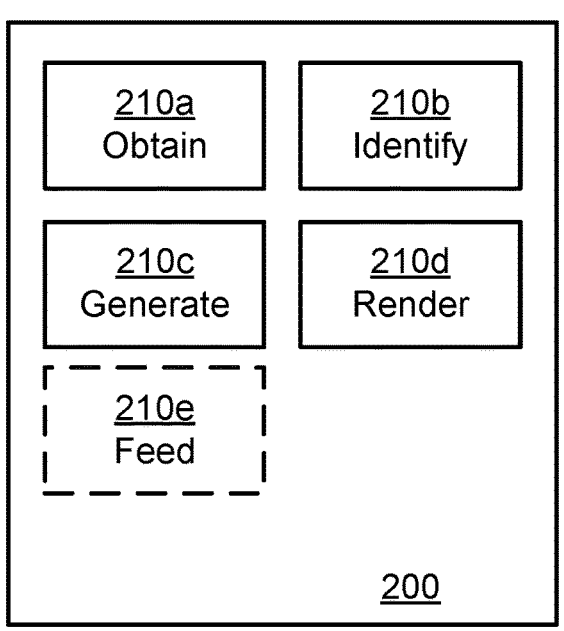
FIG. 10 is a schematic diagram showing functional modules of an image processing device according to an embodiment.

FIG. 10 schematically illustrates, in terms of a number of functional modules, the components of an image processing device 200 according to an embodiment. The image processing device 200 of FIG. 10 comprises a number of functional modules; an obtain module 210a configured to perform step S102, an identify module 210b configured to perform step S104, a generate module 210c configured to perform step S106, and a render module 210d configured to perform step S108. The image processing device 200 of FIG. 10 may further comprise a number of optional functional modules, such as a feed module 210e configured to perform step S110. In general terms, each functional module 210a: 210e may in one embodiment be implemented only in hardware and in another embodiment with the help of software, i.e., the latter embodiment having computer program instructions stored on the storage medium 230 which when run on the processing circuitry makes the image processing device 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a:210e may be implemented by the processing circuitry 210, possibly in cooperation with the communications interface 220 and/or the storage medium 230.

The processing circuitry 210 may thus be configured to from the storage medium 230 fetch instructions as provided by a functional module 210a:210e and to execute these instructions, thereby performing any steps as disclosed herein.

The image processing device 200 may be provided as a standalone device or as a part of at least one further device. A first portion of the instructions performed by the image processing device 200 may be executed in a first device, and a second portion of the of the instructions performed by the image processing device 200 may be executed in a second device; the herein disclosed embodiments are not limited to any particular number of devices on which the instructions performed by the image processing device 200 may be executed. Hence, the methods according to the herein disclosed embodiments are suitable to be performed by an image processing device 200 residing in a cloud computational environment. Therefore, although a single processing circuitry 210 is illustrated in FIG. 9 the processing circuitry 210 may be distributed among a plurality of devices, or nodes. The same applies to the functional modules 210a: 210e of FIG. 10 and the computer program 1120 of FIG. 11.

Figure 11:
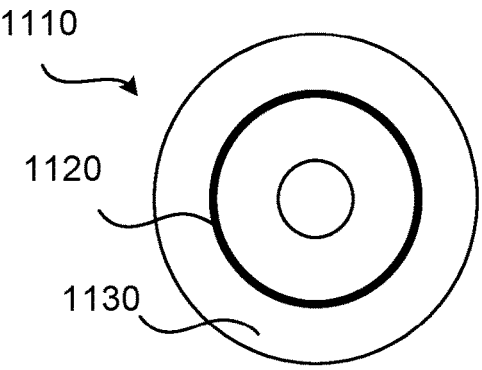
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for rendering a synthetic digital image, the method being performed by an image processing device, the method comprising:

obtaining an original digital image, the original digital image representing a depiction of a visual scene that comprises at least one object;

identifying a first object in the original digital image, the first object being bounded by a bounding box in the original digital image;

generating a synthetic object by a Generative Adversarial Network processing the first object and a second object, wherein i) the synthetic object has a shape defined by a binary segmentation mask as applied to the first object, and ii) the synthetic object has a texture and colour based on the second object; and rendering the synthetic digital image by, in the original digital image, replacing the first object in the bounding box with the synthetic object.

2. The method of claim 1, wherein the second object is obtained from outside the original digital image.

3. The method of claim 2, wherein the second object is obtained from any of: a production stencil, a three-dimensional, 3D, Computer Aided Design, CAD, drawing, a digital blueprint, a digital image different from the original digital image.

4. The method of claim 1, wherein the visual scene comprises at least two objects, and wherein the second object is obtained from the original digital image.

5. The method of claim 1, wherein the bounding box of the first object is a first bounding box, wherein the second object is bounded by a second bounding box, and wherein at least one of the first object and the second object is scaled such that the second bounding box is of same size as the first bounding box.

6. The method of claim 1, wherein the first object is delimited by a contour, and wherein the binary segmentation mask follows the contour of the first object.

7. The method of claim 1, wherein the first object is delimited by a contour, and wherein the binary segmentation mask when applied to the first object deviates from the contour of the first object.

8. The method of claim 7, wherein the binary segmentation mask extends beyond the contour of the first object, and wherein the texture and colour in the part of the synthetic object that extends beyond the contour of the first object is based on at least one of: the texture and colour of the second object, texture and colour of a third object, context-based texture and colour as provided by the Generative Adversarial Network.

9. The method of claim 1, wherein part of the texture and colour of the first object is preserved when being processed by the Generative Adversarial Network.

10. The method of claim 9, wherein the first object is delimited by a contour, wherein the binary segmentation mask when applied to the first object at least partly is confined within the contour of the first object, and wherein the part of the texture and colour of the first object that is not at least partly covered by the binary segmentation mask is preserved when being processed by the Generative Adversarial Network.

11. The method of claim 1, wherein the binary segmentation mask applied to the first object is a first binary segmentation mask, wherein a second binary segmentation mask is applied to the second object when being processed by the Generative Adversarial Network.

12. The method of claim 1, wherein the method further comprises:

feeding the synthetic digital image as training data to a visual object detector.

US 12,620,204 B2

13

13. The method of claim 1, wherein the first object represents a depiction of a piece of industrial equipment in the visual scene.

14. The method of claim 13, wherein the piece of industrial equipment is part of any of: a telecommunication system, an electric power grid, an oil and/or gas production facility, an industrial process site.

15. An image processing device for generating a synthetic digital image, the image processing device comprising processing circuitry, the processing circuitry being configured to cause the image processing device to:

obtain an original digital image, the original digital image representing a depiction of a visual scene that comprises at least one object (120:150);

identify a first object in the original digital image, the first object being bounded by a bounding box in the original digital image;

generate a synthetic object by a Generative Adversarial Network processing the first object and a second object, wherein the synthetic object has a shape defined by a binary segmentation mask as applied to the first object, and wherein the synthetic object has a texture and colour based on the second object; and render the synthetic digital image by, in the original digital image, replacing the first object in the bounding box with the synthetic object.

16. The image processing device of claim 15, wherein the second object is obtained from outside the original digital image.

17. The image processing device of claim 16, wherein the second object is obtained from: a production stencil, a three-dimensional Computer Aided Design drawing, a digital blueprint, or a digital image different from the original digital image.

18. A non-transitory computer readable storage medium storing a computer program for generating a synthetic digital image, the computer program comprising computer code which, when run on processing circuitry of an image processing device, causes the image processing device to:

obtain an original digital image, the original digital image representing a depiction of a visual scene that comprises at least one object (120:150);

identify a first object in the original digital image, the first object being bounded by a bounding box in the original digital image;

generate a synthetic object by a Generative Adversarial Network processing the first object and a second object, wherein the synthetic object has a shape defined by a binary segmentation mask as applied to the first object, and wherein the synthetic object has a texture and colour based on the second object; and render the synthetic digital image by, in the original digital image, replacing the first object in the bounding box with the synthetic object.

* * * * *